(12) United States Patent
Maehler et al.

(10) Patent No.: US 10,360,010 B1
(45) Date of Patent: Jul. 23, 2019

(54) METHOD AND SYSTEM FOR IMPLEMENTING AN ATM MANAGEMENT AND SOFTWARE POLICY TOOL

(71) Applicant: JPMorgan Chase Bank, N.A., New York, NY (US)

(72) Inventors: Jon Maehler, Westerville, OH (US); Saket A. Pradhan, Westerville, OH (US); Joseph R. McCullough, Westerville, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 15/656,371

(22) Filed: Jul. 21, 2017

(51) Int. Cl.
*G06F 8/61* (2018.01)
*G06Q 20/10* (2012.01)
*G06F 8/65* (2018.01)

(52) U.S. Cl.
CPC ............... *G06F 8/61* (2013.01); *G06F 8/65* (2013.01); *G06Q 20/1085* (2013.01)

(58) Field of Classification Search
CPC ..... G06F 8/60; G06F 8/61; G06F 8/63; G06F 8/65; G06F 8/654; G06F 8/658; G06F 8/66; G06F 9/44505
USPC .................................. 717/168–178
See application file for complete search history.

(56) References Cited

U.S. PATENT DOCUMENTS

| | | | |
|---|---|---|---|
| 6,578,142 B1 * | 6/2003 | Anderson | G06F 8/61 713/2 |
| 6,615,405 B1 * | 9/2003 | Goldman | G06F 8/60 717/174 |
| 6,904,592 B1 * | 6/2005 | Johnson | G06F 8/65 705/52 |
| 7,164,907 B2 * | 1/2007 | Cochran | G06F 9/4411 455/418 |
| 7,704,147 B2 * | 4/2010 | Quraishi | G07F 17/32 463/17 |
| 7,785,204 B2 * | 8/2010 | Wells | A63F 13/12 380/251 |
| 7,912,914 B2 * | 3/2011 | Coutts | G06Q 20/1085 709/212 |
| 8,185,620 B1 * | 5/2012 | Boone | H04L 12/66 709/218 |
| 8,607,226 B2 * | 12/2013 | Herrero | G06F 8/65 717/174 |
| 9,547,564 B1 * | 1/2017 | Troutman | G06F 8/61 |
| 2002/0137217 A1 * | 9/2002 | Rowe | A63F 13/12 436/42 |

(Continued)

OTHER PUBLICATIONS

D. Bradbury, "Why we need better ATM security," in Engineering & Technology, vol. 11, No. 1, pp. 32-35, Feb. 2016. (Year: 2016).*

(Continued)

*Primary Examiner* — Andrew M. Lyons
(74) *Attorney, Agent, or Firm* — Hunton Andrews Kurth LLP

(57) ABSTRACT

The invention relates to a computer implemented system that automates ATM deployment. The innovative system identifies software installation data for one or more ATM remote devices; transmits the software installation data as a preload to the one or more ATM remote devices, prior to a software build; identifies an associated network segment of the one or more ATM remote devices; and identifies bandwidth data for the network segment relevant to software download progress.

18 Claims, 8 Drawing Sheets

(56) References Cited

U.S. PATENT DOCUMENTS

| | | | |
|---|---|---|---|
| 2002/0161867 A1* | 10/2002 | Cochran | H04L 29/12009 709/221 |
| 2002/0188940 A1* | 12/2002 | Breckner | A63F 13/12 717/175 |
| 2004/0180721 A1* | 9/2004 | Rowe | G06F 8/65 463/42 |
| 2004/0210653 A1* | 10/2004 | Kanoor | G06F 8/65 709/223 |
| 2005/0188170 A1* | 8/2005 | Yamamoto | G06F 8/65 711/170 |
| 2005/0198631 A1* | 9/2005 | Bisher | H04L 41/0806 717/178 |
| 2006/0080653 A1* | 4/2006 | Siwatu | G06F 8/61 717/173 |
| 2007/0168874 A1* | 7/2007 | Kloeffer | G06F 8/65 715/764 |
| 2007/0220510 A1* | 9/2007 | Bell | G06F 9/453 717/174 |
| 2008/0276301 A1* | 11/2008 | Nataraj | G06F 8/60 726/3 |
| 2009/0113413 A1* | 4/2009 | Reinz | G16H 40/40 717/173 |
| 2009/0235244 A1* | 9/2009 | Enomori | G06F 8/65 717/170 |
| 2009/0235245 A1* | 9/2009 | Andersson | G06F 8/65 717/172 |
| 2009/0259592 A1* | 10/2009 | Isaacson | G06Q 20/10 705/72 |
| 2010/0293024 A1* | 11/2010 | Feng | G06Q 10/1093 705/7.18 |
| 2011/0004678 A1* | 1/2011 | Rothrock | G06F 8/65 709/223 |
| 2011/0113070 A1* | 5/2011 | McCurdy | G06F 8/65 707/802 |
| 2011/0113415 A1* | 5/2011 | McCurdy | G06F 8/61 717/168 |
| 2011/0113416 A1* | 5/2011 | McCurdy | G06F 8/65 717/168 |
| 2011/0113417 A1* | 5/2011 | McCurdy | G06F 8/65 717/170 |
| 2011/0113418 A1* | 5/2011 | McCurdy | G06F 8/658 717/170 |
| 2011/0113420 A1* | 5/2011 | Ewington | G06F 8/658 717/171 |
| 2011/0307336 A1* | 12/2011 | Smirnov | G06F 8/64 705/14.62 |
| 2012/0047029 A1* | 2/2012 | Veres | G06Q 30/02 705/14.73 |
| 2013/0007200 A1* | 1/2013 | van der Schaar | H04L 47/12 709/217 |
| 2013/0024778 A1* | 1/2013 | Reeves | G06F 3/1423 715/744 |
| 2013/0219381 A1* | 8/2013 | Lovitt | G06F 8/65 717/173 |
| 2013/0231093 A1* | 9/2013 | Toy | H04W 4/00 455/414.1 |
| 2013/0326493 A1* | 12/2013 | Poonamalli | G06F 8/65 717/168 |
| 2014/0096126 A1* | 4/2014 | Gourlay | G05B 15/02 717/173 |
| 2014/0122666 A1* | 5/2014 | Malhotra | G06F 8/61 709/220 |
| 2014/0237463 A1* | 8/2014 | Sriram | G06F 8/65 717/172 |
| 2014/0237465 A1* | 8/2014 | Lin | H04L 67/1063 717/173 |
| 2015/0020186 A1* | 1/2015 | Deutsch | H04L 29/12367 726/11 |
| 2015/0317151 A1* | 11/2015 | Falcy | H04L 67/28 717/173 |
| 2016/0092207 A1* | 3/2016 | Chhatwal | H04L 41/082 717/121 |
| 2016/0188317 A1* | 6/2016 | Hilliar | G06F 8/65 717/172 |
| 2016/0202964 A1* | 7/2016 | Butcher | G06F 8/65 717/172 |
| 2017/0090894 A1* | 3/2017 | Maus | G06F 8/60 |
| 2017/0144858 A1* | 5/2017 | Gandhi | B66B 1/3415 |
| 2017/0168800 A1* | 6/2017 | Isaacson | G06F 8/65 |
| 2017/0242678 A1* | 8/2017 | Sangameswaran | G06F 8/65 |
| 2018/0074886 A1* | 3/2018 | Ewington | G06F 11/0793 |
| 2018/0173516 A1* | 6/2018 | Tung | G06F 8/654 |
| 2018/0248749 A1* | 8/2018 | Chou | H04L 67/34 |
| 2019/0004785 A1* | 1/2019 | Kelley | G06F 8/65 |

OTHER PUBLICATIONS

S. Brown and C. J. Sreenan, "A new model for updating software in wireless sensor networks," in IEEE Network, vol. 20, No. 6, pp. 42-47, Nov.-Dec. 2006. (Year: 2006).*

* cited by examiner

ATM PhoneHome

Phone Home Results: Successful
TIME=[2017/06/01 5:35:41 PM]

[Hide Results]

MACADDRESS=[MAC########] : SERVER=[##.###.###.###]

| | |
|---|---|
| ABUILD | EATM_2017##### _01_AB### |
| ADEVTYPE | LEGACY |
| AENV | S |
| AFAMILY | DEFAULT |
| AMACADDR | 00########## |
| AMAKE | NCR |
| AMODEL | 9999 |
| ATMDOM | INTERNAL |
| CARDREADERORIENTATION | HORIZONTAL |
| CARDREADERTYPE | DIP |
| CASHDISPENSERDENOMINATIONCONFIGURATION | TWENTIESONLY |
| CASHERECYCLERMODE | NOTSUPPORTED |
| CASSETTECONFIGURATION | TWENTIES |
| COINDISPENSERDENOMINATIONCONFIGURATION | |
| COINDISPENSERPRESENT | FALSE |

[Apply] [Refresh]

Figure 5

View Device Info Messages

| # | MILESTONE | LAST ACTION | STAT DATE | END DATE | DURATION | ESTIMATED TIME | STATUS |
|---|---|---|---|---|---|---|---|
| 1 | ATM BAU INSTALL | ATMINSTALL_INSTALL_START | 6/5/2017 1:33:58 AM | 6/5/2017 1:49:57 AM | 16 | 60 | OK |
| 2 | ATM BAU INSTALL | ATMINSTALL_INSTALL_SOFTWARE_SUCCESS | 6/5/2017 1:49:57 AM | 6/5/2017 1:49:57 AM | 9 | 15 | Completed |
| 3 | ATM BAU IN-SERVICE | ATMINSTALL_INSERVICE_WATCH_START | 6/5/2017 1:58:17 AM | 6/5/2017 1:58:23 AM | 0 | 60 | OK |
| 4 | ATM BAU IN-SERVICE | ATMINSTALL_ATM_INSERVICE_SUCCESS | 6/5/2017 1:58:23 AM | 6/5/2017 1:58:23 AM | 2270 | 0 | Completed |

Figure 7

METHOD AND SYSTEM FOR IMPLEMENTING AN ATM MANAGEMENT AND SOFTWARE POLICY TOOL

CROSS REFERENCE TO RELATED APPLICATIONS

This application is related to U.S. patent application Ser. No. 15/656,243, filed Jul. 21, 2017, and U.S. patent application Ser. No. 15/656,310, filed Jul. 21, 2017, the contents of which are incorporated herein by reference in their entirety.

FIELD OF THE INVENTION

The present invention generally relates to ATM deployment and more specifically to automated ATM deployment using a combination of unique components, including: (1) Phone Home and Scrapper Mapping Tool, (2) ATM Management Tool, (3) Software Policy Tool and (4) Retail Event Management Tool. These tools enable an entity to discover and manage a fleet of ATM devices, resolve software related issues and further ensure proper software delivery to a particular ATM endpoint.

BACKGROUND OF THE INVENTION

ATM deployment is greatly dependent on a vendor supported technician's site visit as part of the imaging process. This process, however, provides little or no visibility into the ATM for remote rebuilds. Current methodologies require a manual install or update of a gold CD by a technician at each ATM. This process is inefficient and results in delays given that a vendor must create a CD, test the CD, produce the CD and then distribute the CD. Currently, ATMs experience an unsatisfactory level of downtime to update, deploy and install software. This leads to degradation of service and impaired availability at the ATM for the customers. Additionally, the lack of visibility to the devices results in more errors and the lack of standardization makes remote troubleshooting/remediation increasingly difficult.

Lack of centralized reporting and standardization in the media formats delivered by the vendors for software level management and deployments result in downtime, lack of remote recoverability and no accurate reporting for support. Accordingly, current ATM deployment results in a large increase in cost to supportability to a financial institution.

These and other drawbacks exist.

SUMMARY OF THE INVENTION

Accordingly, one aspect of the invention is to address one or more of the drawbacks set forth above. According to an embodiment of the present invention, a computer implemented system automates ATM deployment. The system comprises: a centralized server comprising a processor; a standardized repository that stores ATM configuration data; and a datacenter that communicates via a communication network to a first plurality of remote devices, via a remote server, and to a second plurality of remote devices; the centralized server comprises an ATM management tool configured to perform the steps of: identifying software installation data for one or more ATM remote devices; transmitting the software installation data as a preload to the one or more ATM remote devices, prior to a software build; identifying an associated network segment of the one or more ATM remote devices; and identifying bandwidth data for the network segment relevant to software download progress.

According to another embodiment of the present invention, a computer readable medium contains program instructions for automating ATM deployment, wherein execution of the program instructions by one or more processors of a computer system causes the one or more processors to carry out the steps of: identifying software installation data for one or more ATM remote devices; transmitting the software installation data as a preload to the one or more ATM remote devices, prior to a software build; identifying an associated network segment of the one or more ATM remote devices; and identifying bandwidth data for the network segment relevant to software download progress.

According to an embodiment of the present invention, a computer implemented method automates ATM deployment. The method comprises the steps of: identifying software installation data for one or more ATM remote devices; transmitting the software installation data as a preload to the one or more ATM remote devices, prior to a software build; identifying an associated network segment of the one or more ATM remote devices; and identifying bandwidth data for the network segment relevant to software download progress.

The computer implemented system, method and medium described herein provide unique advantages to the ATM deployment process, according to various embodiments of the invention. An embodiment of the present invention is directed to software delivery to an ATM fleet, allowing for touchless installs and elimination of manual builds via Gold CDs. The innovative system and method enable users to remotely build, maintain, update and keep record of ATM operating software. The various features of the embodiments of the present invention realize benefits including increased customer satisfaction; elimination of down-time during software distributions; quicker distribution of fixes to production issues and future Enterprise Releases; elimination of manual software distributions; and ownership and full control over the operating software. These and other embodiments and advantages of the invention will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

FIG. 5 is an exemplary screenshot of a Phone Home interface, according to an embodiment of the present invention.

FIG. 7 is an exemplary screenshot of a REM Tool, according to an embodiment of the present invention.

DESCRIPTION OF EMBODIMENTS OF THE INVENTION

Figure 1:
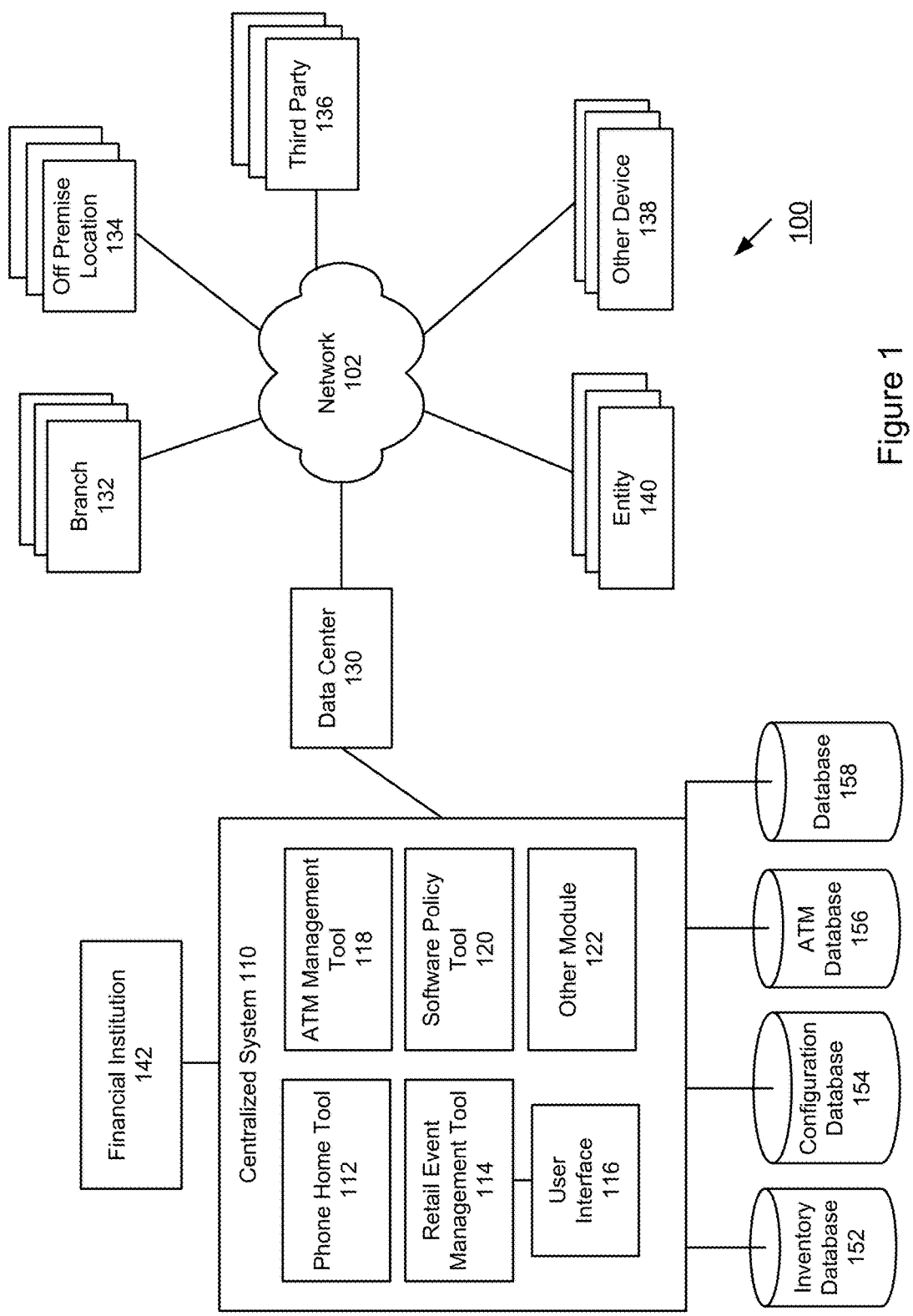
FIG. 1 is an exemplary system diagram of an Automated ATM Deployment Framework, according to an embodiment of the present invention

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to an innovative ATM Operating System design that leverages managed image formats rather than vendor controlled formats for compliance and updates. In accordance with the various embodiments of the present invention, "ATM Operating System" or "operating software" refers to a comprehensive software solution that manages various aspects of ATM devices and further comprises software drivers that communicate with and/or control various devices and/or systems, middleware component that translates hardware functions to/from software commands and a presentation layer that delivers and formats information for display to various users. An embodiment of the present invention further utilizes a software scheduling tool and an innovative ATM Operating System design that takes advantage of proxy preloads. For remote machines, an embodiment of the present invention may utilize external storage components for preloading data for improved software distribution and updates. The system further implements BIOS changes (where necessary) to allow remote machines to boot from an external memory component, such as a universal serial bus (USB) stick.

An embodiment of the present invention is directed to an innovative Software Policy Tool that provides maximum automation, flexibility and integration in an ATM policy model while providing various unique features including Multiple General Availability builds (GA-x) from different versions of preloaded USB sticks; support for Rolling GA's/Rolling Pilots; elimination of deployment related Active Directory (AD) replication timing concerns; and reduction of Active Directory Replications by elimination of group membership population churn. An embodiment of the present invention provides a straightforward approach for integrating with a Software Scheduling Tool by providing a repeatable, consistent entitlement process for various deployments and automated entitlements for preload of "next" releases.

An embodiment of the present invention is directed to a Software/OS configuration management tool that is customized to reach an extreme amount of automation and interchangeability that is tailored for specific ATM support processes, network environments and software load nuances.

An embodiment of the present invention is directed to a componentized approach to Operating Systems and software delivery. It may be extended to various lines of business, industries and applications.

An embodiment of the present invention is directed to encrypting a hard drive to protect confidential data and improving ATM security portfolio (e.g., patch compliance, Anti-Virus updates, etc.). The various features of the system provide improved visibility to problems and issues in the field. Other features include touchless rebuild and improved visibility to deployed software as well as internal controls. For example, software may be staged on a branch server or external memory component (e.g., USB stick) ahead of installation, allowing more installs over a period of time. The system further reduces down time. For example, an ATM may be out of service for a limited event, such as when installing new software, thereby allowing ATMs to be in service for significantly more time. In addition, large software distributions may be remotely staged and ATMs may be updated via touchless installs.

Upon post imaging, an ATM may have a software package that encrypts a system drive. The system may encrypt locations on the disk where personally identifiable information (PII) and other sensitive data may potentially exist.

An embodiment of the present invention addresses various types of ATMs, including internal ATMs and external ATMs. Internal ATMs may be connected to a branch network whereas external ATMs are separate and standard alone devices (e.g., parking lot, shopping malls, etc.). An embodiment of the present invention is directed to enabling an entity to automate software updates and image changes where the entity controls deployment and matches images on the ATM devices. Other features include remotely building, maintaining, updating and keeping the record of ATM Operating Systems.

An embodiment of the present invention is directed to distributing software code in a more efficient, effective and highly secure manner. For example, branch ATMs are connected to branch servers that run teller and other systems. The branch servers have available storage to hold operating software images, large software updates for branch PCs and other devices. An embodiment of the present invention may leverage the available storage technology where the software may be distributed via a distribution network to an ATM endpoint.

An embodiment of the present invention is directed to providing additional security to a software delivery system that is unique and critical to financial institutions and ATM devices. This may involve ensuring the operating software is secure and the configuration data is correct, which may include observing, recording and understanding configuration of every endpoint.

An embodiment of the present invention may be directed to a combination of unique components, which includes (1) Phone Home and Scrapper Mapping Tool, (2) ATM Management Tool, (3) Software Policy Tool and (4) Retail Event Management Tool. These tools enable an entity to discover and manage a fleet of ATM devices, resolve software related issues and further ensure proper software delivery to a particular ATM endpoint.

ATMs devices are traditionally required to be out of service during CD installation, which could involve a dozen or so CDs. This process is labor intensive and time consuming. Moreover, traditional software distribution occurred over a wireline from a central hub directly to every endpoint. With this traditional architecture, current systems experienced inefficiencies because when the software was streamed down directly to each ATM, the ATM was taken out of service at the start of any software download. The process was further complicated because ATM devices may have different types of connections, including older outdated connections (e.g., wireline, dial-up modem, etc.). In addition, there is a large configuration spread in terms of different vendors, different models of ATM devices and different options/features associated with a particular ATM device.

An embodiment of the present invention is directed to minimizing ATM downtime during software distribution. An embodiment of the present invention enables software downloads while the ATM is in service. In addition, during software installs where downtime may be required and unavoidable, an embodiment of the present invention stores required files locally thereby expediting software installs and further reducing ATM downtime during installs. Accordingly, an embodiment of the present invention implements a central hub to local hub architecture where each local hub is connected directly to one or more ATM endpoints.

An embodiment of the present invention is directed to a Phone Home and Scrapper Mapping Tool that implements a standardized repository of ATM configurations required for software builds. The Phone Home and Scrapper Mapping Tool represents an automated inventory and/or configuration collection tool for drift analysis. Configuration drift may be a result of inconsistent configuration items across various devices. Configuration drift occurs when changes to software and hardware are made ad hoc and are not recorded or tracked in a comprehensive and systematic fashion.

An embodiment of the present invention maintains a list of device attributes in a centralized repository. For ATM devices, the list of attributes may include device-specific features, including cash-dispenser, card-reader, screen orientation, keypad to enter PIN, network configuration data, IP address, etc. An embodiment of the present invention provides a communication channel between the centralized repository and each individual ATM device. In addition, communication may be established with other subsystems and other systems. For example, Eagle system represents ticketing and configuration servers. Radia servers represent a configuration management tool to configure ATM devices.

At the ATM level, each ATM device may execute a script that programmatically provides the ability to self-identify and basically "phone-home." Accordingly, the ATM device may request and access the requisite record (or data) based on the ATM's self-identification and automatically initiate a build and/or software update. An embodiment of the present invention is therefore directed to synchronizing ATM devices and implementing a single process for self-identify configuration data among a host of disparate ATM devices. The system further updates and/or changes configuration data centrally and/or locally as needed. The Phone Home and Scrapper Mapping Tool essentially scrapes attributes off of an ATM device and then compares the scraped data against a system of record that is centrally maintained. Based on the comparison, adjustments may be made to the centralized system and then flow back down to the ATM device.

For example, the Phone Home and Scrapper Mapping Tool may access attributes from an ATM device. With the attribute information, a build process may be initiated. During the build process, the Phone Home and Scrapper Mapping Tool may confirm that the system is synchronized with what the configuration data should be and what the configuration of record indicates. As a result of the configuration data being synchronized, the system may initiate a touchless install of software because the system is confident that the configuration is correct and current.

According to another example, an embodiment of the present invention may maintain business logic, operating software logic and build logic. The Phone Home and Scrapper Mapping Tool may identify and initiate a build for one or more ATM devices. For example, an entity may execute multiple builds on an ATM for software revisions. Accordingly, the Phone Home and Scrapper Mapping Tool may manage various software releases, perform a comparison, identify and further maintain the differences, changes and/or updates from release to release.

The system may manage various levels of software at any given time for any ATM device. For example, the system may manage multiple levels of software which may include a software level, a patching level and a maintenance level. The software level may include software components that make the ATM device operate and secure as well as security products, operating software products, application products and/or other products. The patch level may include various patching for operating software. The patch release may be governed by a manufacturer or other third party entity. The patch releases may be on a different schedule as the software releases. The maintenance level ensures that the software code is current. An embodiment of the present invention further enables selective updates to a subset of ATM devices and updates on different schedules.

According to an embodiment of the present invention, the Phone Home and Scrapper Mapping Tool collects configuration data from a plurality of remote devices and sends the configuration data to a centralized system. The remote devices may be located in many different locations, where the devices are different makes and models. The Tool may be applied generally for inventory reconciliation in various other scenarios and applications. This tool is not limited to ATM devices.

An embodiment of the present invention is directed to a Retail Event Management Tool that represents a front end user interface (UI) to integrate multiple backend systems to provide a simplified user interface. The REM Tool further controls OS migrations, software uplift and patch compliance with high level visibility and the ability to drill down to details at the terminal level. The REM Tool provides flexibility in who can access what information and at what level. The REM Tool further provides flexibility in scheduling releases, updates and/or other software related actions. For example, a particular update may be scheduled (or hard coded) for the 2:00-3:00 am timeframe. The REM Tool enables an operator or other user to schedule software releases for a particular subset of ATM devices on a given day, and/or time frame. The REM tool further provides flexibility to address various situations and scenarios, including a vulnerability (e.g., breach, threat, blackout, etc.). In this type of example, the REM Tool may enable an operator or other user to schedule immediate patches or anti-viral action for deployment.

According to an embodiment of the present invention, the REM Tool may be applied to various end devices, such as work stations. For example, the REM Tool may be applied to work station reimages and server upgrades. The REM Tool may provide an interface that provides details relating to migrating thousands of devices. The REM Tool provides monitoring features for various devices in a branch and/or other location.

The Tool may be applied generally for inventory reconciliation in various other scenarios and applications. This tool is not limited to ATM devices.

An embodiment of the present invention is directed to an ATM Management Tool that represents an automated tool for ATM preloading for software and patch management. ATM Management Tool provides unified and centralized distribution readiness for various ATM environments. The ATM Management Tool may represent a custom tool developed on top of or in conjunction with a configuration management software (e.g., Radia). The ATM Management Tool enables ATMs from a client side level (the ATM level) to integrate with the Phone Home and Scrapper Mapping Tool, and then self-direct itself to keep software and patch management current. In this example, the system pre-loads relevant data, such as installation data, so that ATMs do not need to be taken out of service while software is downloaded and installed. Accordingly, the ATM Management Tool unifies the Phone Home process with various other environments. The Phone Home Tool runs through different phases periodically or based on a schedule and verifies the intended software level. The Phone Home Tool further verifies that for a particular software level, the system should check in with the configuration management system and verify the software needed. If the software is retrieved, then the system may move on. If not, the software may be downloaded.

The ATM Management Tool further identifies the network segment associated with the ATM device. For example, an ATM may be associated with a branch device or the ATM may be a remote device. Each ATM may have a different type of connection with various bandwidth and other constraints. According to an embodiment of the present invention, an ATM device may self-download and pre-load software and patch pieces ahead of a software distribution and also provide feedback on download progress for efficient bandwidth management. Bandwidth management is particularly important when thousands of devices are being updated in batches. An embodiment of the present invention is directed to scheduling downloads for ATM devices and thereby address configuration drift.

According to an embodiment of the present invention, a Patch Manager allows efficient maintenance of an environment through a complete, straightforward and thorough process. The Patch Manager allows for the acquisition of an operating system (OS) and application Patches identified and released by a manufacturer, vendor, third party and/or other source. This alleviates the manual process of downloading and packaging individual patches. It also simplifies the patch process, as it is no longer required to manually identify which particular patch applies for each specific operating software, installed application or desktop environment. This may be performed automatically by the Patch Manager based on the information provided in each Patch release.

A Patch Manager Agent provides automatic and continuous discovery of products that are installed on each device. It provides identification of applicable software products, the security patches that are already applied by each software product, and highlights additional vulnerability and further provides a mitigating patch. The Patch Manager Agent also provides a unique desired-state management that automatically and continuously ensures that security patches remain applied in their proper state as prescribed by policy. ATM devices may be monitored and checked against policy and, if found to be out of compliance, these devices may be automatically adjusted to desired patch levels.

The ATM Management Tool may be aware of remote device location, network location, etc. The ATM Management Tool maintains up-to-date data for software preloading and operating software enhancements. By leveraging operating software deployment, the ATM Management Tool preloads software components to the ATM device and further utilizes existing cache. By managing and storing preloaded software data locally, the system may efficiently and quickly re-stage and/or re-image ATM devices when needed. The ATM Management Tool keeps the data intact on the operating software while leveraging the capability to re-image the ATM device. For example, the local cache may be available for internal ATMs that are connected to a server or other processing component. For external ATMs, the system may use an external storage, e.g., USB sticks, to provide a storage component that enables pre-staging these devices with necessary cache files for operating software. The cache files may then be used for operating software builds and software updates.

An embodiment of the present invention is directed to preloading resource binaries onto an ATM device, specifically a cache partition on hard drive and/or USB. This allows for an ATM to recover from a remote image quicker by having these large file resources staged locally. This further prevents long download times over potentially small WAN links.

An exemplary process may involve a combination of USB/data partition on a hard drive to store these proprietary binaries. This process may use the USB for vendor field stick rebuilds at the ATM, and/or permanently connected USBs for remote reimaging in case of hard drive failures at remote locations and preloading delta differences over the wire to maintain an up-to-date cache. In remote scenarios, the USB may hold downloaded files for the local ATM to utilize.

For example, USB media may be used for ATM rebuilds when an ATM OS is deemed inoperable or hardware is replaced for remote connected ATMs. An exemplary USB media may contain: folder structure for OS rebuild usage, updated media resources/files to assist in a local cache repository for faster rebuild images (e.g., Radia boot WIM, OS image file, OS Driver files, Software install/configuration resources, scripts, etc.). In this example, no check images or customer data information will be housed/stored on the USB sticks.

An embodiment of the present invention is directed to a Software Policy Tool. The Software Policy Tool uses a unified software distribution approach to manage various components of ATM software building blocks to support multiple Manufacturer/Model combinations. The Software Policy Tool is directed to taking very different systems with possibly different needs (e.g., as in multiple different vendors, multiple different sub models, etc.) and standardizing those into one model approach, specifically, a software model as well as being able to go from software release to software release. The Software Policy Tool provides the ability to identify vendors and models affected by a given release. For a particular build in a particular release, the Software Policy Tool may identify pieces of software tied to these models and/or manufacturers. From old release to new release, the Software Policy Tool may determine that everything is the same, except for one or two different pieces that may need to be changed or updated. The Software Policy Tool provides the ability to perform version differencing from old to new release and further limit changes to the one or two pieces without taking the entire system offline.

The Software Policy Tool provides standardization that may be leveraged across many different applications, etc. The Software Policy Tool may be applied to software management and device management. The Software Policy Tool is not limited to ATM devices and may be applied to various systems, servers, work stations, network appliances, etc.

FIG. 1 is an exemplary system diagram of an Automated ATM Deployment Framework, according to an embodiment of the present invention. Data Center 130 may include a Centralized System 110. Centralized System 110 may represent a server, processor and/or other computer components and include various models and/or tools, including Phone Home Tool 112, Retail Event Management Tool 114, ATM Management Tool 118 and Software Policy Tool 120. Retail Event Management Tool 114 may include an Interface and/or other UI, represented by 116. Other modules and tools may be represented by Other Module 122. Centralized System 110 may store and manage data in various storage components, including Inventory Database 152, Configuration Database 154, ATM Database 156, Other Database 158, etc. These modules, tools and components are exemplary and illustrative, the system may include additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

Phone Home and Scrapper Mapping Tool 112 implements a standardized repository of ATM configurations required for a build. Phone Home and Scrapper Mapping Tool 112 represents an automated inventory and/or configuration collection tool for drift analysis. The Phone Home process is applied to the path in which configuration data flows from the centralized servers to the ATM for build/configuration information. The ATM device may then use an address (e.g., media access control (MAC) address) to identify itself to a server (e.g., webserver) at Centralized System 110 and then receive configuration parameters to be used throughout the build.

Manufacturer/Family concept for ATMs may refer to the level at which software may be developed and entitled at. A Family may represent a Family of ATMs defined as a group of ATMs that share a common set of files, configuration and installed packages. Software and firmware may be deployed and configured the same across a family of ATMs.

For example, a web service call (via Phone Home Tool 112) from a server sitting on an ATM may return the Make, Family and Build version back to the ATM client. These values may be substituted and linked to an appropriate policy set. For example, an exemplary Device Management Structure may include a «BUILD» that identifies "ALL ATM"—(Highest level policy container, example: Bank Logic) and «MAKE»—(Medium level Manufacturer package policy, example: XFS) and «FAMILY»—(Lower level package policy, example specific configuration files).

According to an embodiment of the present invention, Phone Home Tool 112 may represent a process that involves an ATM device communicating with a centralized server for remote information about itself and the desired build that is happening. The ATM device may send identifying information to the server (e.g., webserver) and in return, the ATM device may receive configuration parameters to be used throughout the build.

According to an exemplary embodiment, pieces to be captured may include: IP,Gateway,mask,dns1,dns2; Location (merchant, 10.245,branch); Time Zone; Full Host Name (15 characters); Screen Orientation (Portrait/Landscape); Software Stack; Mfg (Wincor, Diebold, Hyosung, NCR); Family; Model; Screen configuration; Unique Identifier (like mac address); State; Stack needed values; and PCE stack needed values.

In addition to the configuration information, with the help of a Software Scheduling Tool, the system may return a build version to the ATM device. The build version may identify which level of the software stack to build or install to. This may be relevant for Business as Usual (BAU) software changes as well as reimages to know which software stack is present on a given USB stick or other external memory. With this approach, an embodiment of the present invention may achieve a "Current Build—X" approach for software deployments that maintains multiple versions of software in production, and targets specific ATMs to a specific build version.

ATM Management Tool 118 represents an automated tool for ATM preloading for software and patch management. ATM Management Application provides unified and centralized distribution readiness for various ATM environments.

For example, a Profile (e.g., model, subset, etc.) may represent a part of a family of ATMs, and may require special sets of files, configuration and installed packages. For example, vendors may assist an infrastructure team to provide a way (e.g., by an executable logic that returns the model, or by identifying an interface to (e.g., management instrumentation, bios, etc.) to programmatically determine one ATM subset from another).

Software Policy Tool 120 applies a unified software distribution approach to manage various components of ATM software building blocks to support multiple Manufacturer/Model combinations.

According to an embodiment of the present invention, the Software Policy Tool may represent the process and procedure where an ATM obtains and uses its software/management entitlements for installations and updates to the ATM devices, terminals. The current state is heavily utilized on the hostname for parsing out the function of the device and translates that into Active Directory entitlements.

To better accommodate the future state of the ATM fleet, an ATM policy model of an embodiment of the present invention may be used for software/patch entitlements. By doing so, the system achieves maximum automation, flexibility and integration in the ATM policy model while providing: support for rolling GA's/Rolling pilots; support for multiple GA builds (GA—X) from different versions of a preloaded USB stick; elimination of deployment related AD Replication timing concerns; reduction of AD Replications by elimination of group membership population churn; straightforward approach for integrating with Software Scheduling tool; repeatable, consistent entitlement process for all deployments and automated entitlements for preload of a next release.

Retail Event Management ("REM") Tool 114 represents a front end UI to integrate multiple backend systems to provide a simplified single pane of glass view. The REM Tool further controls OS migrations, software uplift and patch compliance with both high level visibility and the ability to drill down to details to the terminal level.

Data Center 130 may be communicatively coupled to various end devices via Network 102. For example, Data Center 130 may communicate with Branch Devices 132, Off-Premise Location 134, Third Party Devices 136 and other various devices represented by 138. Such end devices may include ATM devices. According to another embodiment, the devices may represent kiosks, mobile devices, smart devices, terminals, etc. Network 102 may communicate with various vendors, merchants as well as other providers, represented by Entity 140. In addition, Network 102 communicates with Financial Institution 142 that maintains, operates and manages a fleet of ATM devices and other associated devices.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 is depicted, it should be appreciated that other connections and relationships are possible. The system 100 described below may be used to implement the various methods herein, by way of example. Various elements of the system 100 may be referenced in explaining the exemplary methods described herein.

The network 102 may be a wireless network, a wired network or any combination of wireless network and wired network. For example, the network 102 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, the network 102 may support an Internet network, a wireless communication network, a cellular network, Bluetooth, or the like, or any combination thereof. The network 102 may further include one, or any number of the exemplary types of networks mentioned above operating as a stand-alone network or in cooperation with each other. The network 102 may utilize one or more protocols of one or more network elements to which it is communicatively coupled. The network 102 may translate to or from other protocols to one or more protocols of network devices. Although the network 102 is depicted as one network for simplicity, it should be appreciated that according to one or more embodiments, the network 102 may comprise a plurality of interconnected networks, such as, for example, a service provider network, the Internet, a cellular network, corporate networks, or even home networks, or any of the types of networks mentioned above.

Data may be transmitted and received via network 102 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 1 illustrates individual devices or components, it should be appreciated that there may be several of such devices to carry out the various exemplary embodiments. Users may communicate using any mobile or computing device, such as a laptop computer, a personal digital assistant, a smartphone, a smartwatch, smart glasses, other wearables or other computing devices capable of sending or receiving network signals. Customer devices may have an application installed that is associated with Financial Institution 142.

Financial Institution 142 may be communicatively coupled to various databases, represented by Database 152, 154, 156, 158. For example, Database 152 may store device inventory data. Database 154 may represent device configuration data. Database 156 may represent ATM data. Databases may include any suitable data structure to maintain the information and allow access and retrieval of the information. For example, Databases may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

Databases may be any suitable storage device or devices. The storage may be local, remote, or a combination thereof with respect to Databases. Databases may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). Databases may have back-up capability built-in. Communications with Databases may be over a network, such as network 102, or communications may involve a direct connection between Databases and Financial Institution 142, as depicted in FIG. 1. Databases may also represent cloud or other network based storage.

Figure 2:
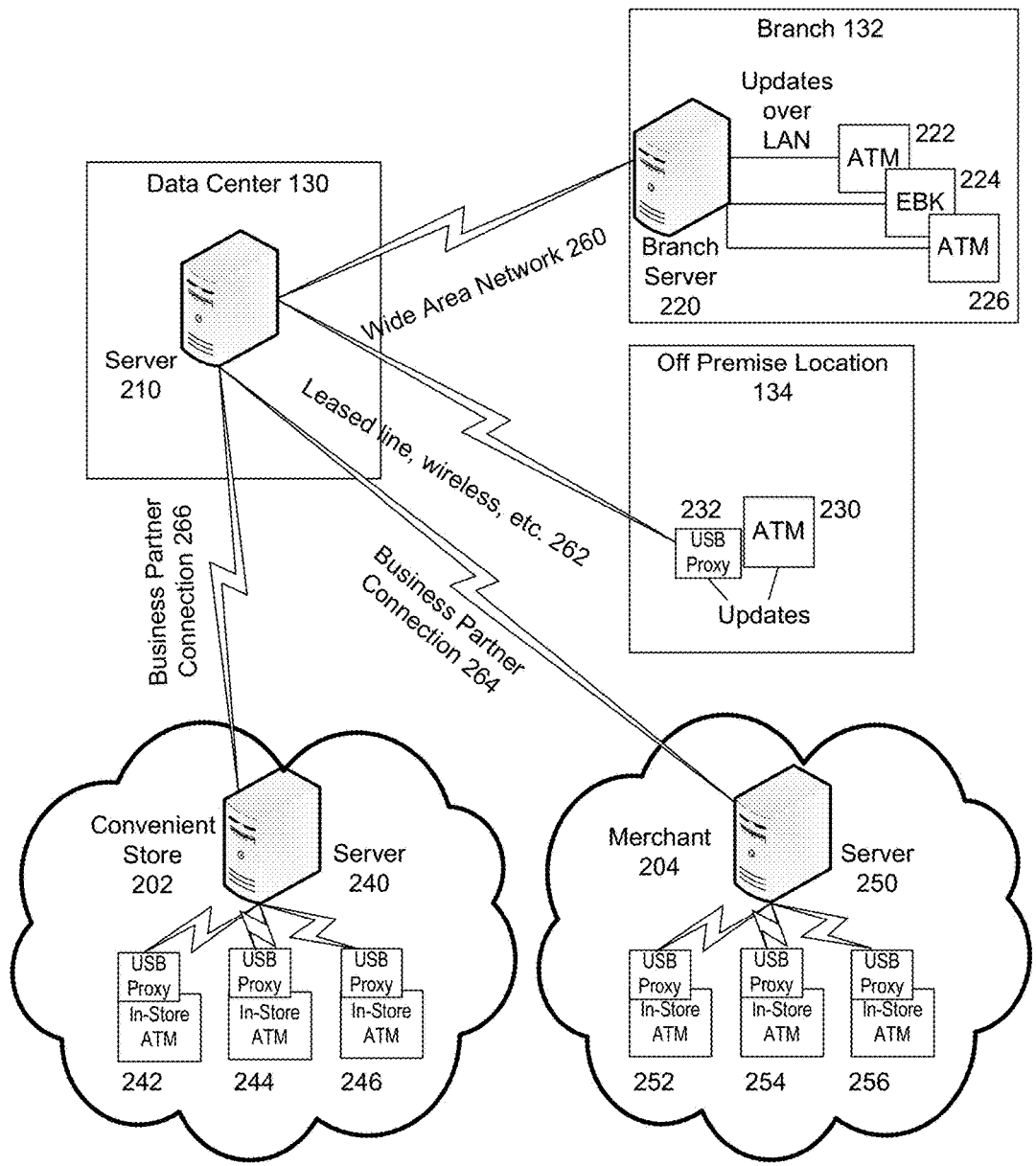
FIG. 2 is exemplary system diagram of an Automated ATM Deployment Framework, according to an embodiment of the present invention.

FIG. 2 is exemplary system diagram of an Automated ATM Deployment Framework, according to an embodiment of the present invention. Current systems provide updates over the WAN or slow leased line, VSAT, wireless. ATM devices are routinely and regularly taken out of service when updates are pushed. Oftentimes, deploying software takes hours.

An embodiment of the present invention improves on the current state of ATM deployment. With the present invention, because the image may be stored locally on the branch server or USB stick, the system may remotely re-image ATMs or EBKs. Accordingly, there is no need for technicians with gold CDs visiting machines for routine software service.

As shown in FIG. 2, Data Center 130 may include one or more servers, represented by Server 210. Data Center 130 may communicate with various remote devices, as shown by Branch 132, Off Premise Location 134, Third Party Entities, such as Convenience Store 202 and Merchant 204. For example, Server 210 may communicate with a Branch Server 220 via a communication network, such as wide area network (WAN) 260. Using communication network 260, stage updates may be performed asynchronously. At Branch 132, a local Branch Server 220 may communicate to local devices, such as ATM 222, Electronic Banking Kiosk (EBK) 224 and ATM 226. Communication may be provided over a local area network (LAN).

Server 210 may communicate with an Off Premise Location 134 via a communication network, such as leased line, wireless, etc., represented by 262. Using communication network 262, stage updates may be performed asynchronously via an external storage, such as a USB stick. At Off Premise Location 134, ATM 230 may have a USB proxy 232 to perform updates and other actions.

Server 210 may communicate with Third Party Entities, such as Convenient Store 202 and Merchant 204, via a communication network, such as a business partner connection, represented by 264, 266. At Convenient Store 202, a merchant server 240 may communicate with remote devices, such as In-Store ATM 242, 244 and 246, via a local network. At Convenient Store 202, ATM 242, 244 and 246 may each have a USB proxy to perform updates and other actions. Similarly, at Merchant 204, a merchant server 250 may communicate with remote devices, such as In-Store ATM 252, 254 and 256, via a local network. At Third Party Entity 138, ATM 252, 254 and 256 may each have a USB proxy to perform updates and other actions.

With an embodiment of the present invention, branches may receive updates from the branch server over a fast LAN. Remote ATMs may receive updates from a USB stick in the ATM. Merchant servers may act as proxy servers in their network, taking the burden off data center servers. Further, code deployment may occur in the background, and does not have to take the device out of service. For example, ATM machines may be taken out of service only when updates are installed.

Figure 3:
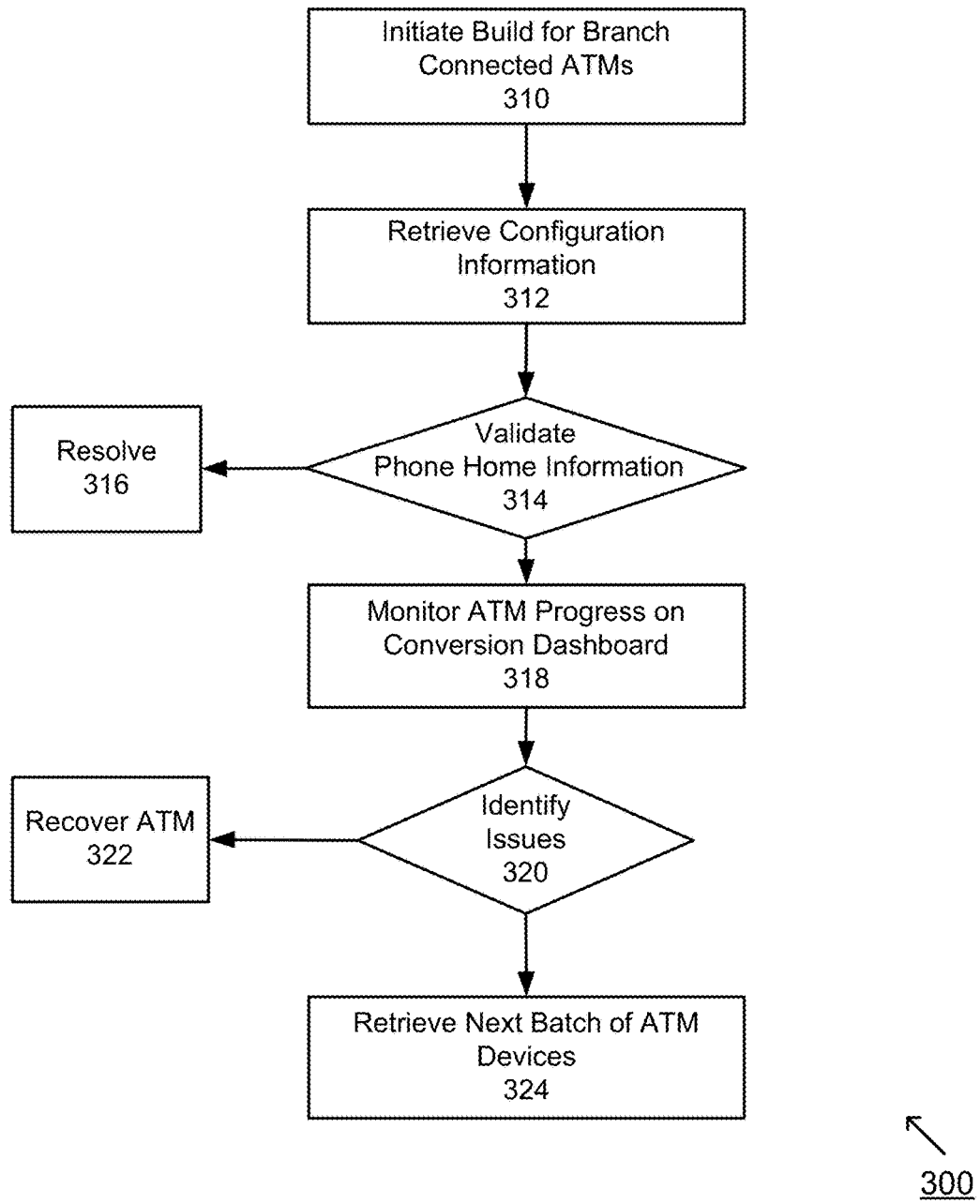
FIG. 3 is an exemplary flowchart for an ATM device conversion process, according to an embodiment of the present invention.

FIG. 3 is an exemplary flowchart for an ATM device conversion process, according to an embodiment of the present invention. At step 310, a build for an ATM device may be initiated. The build may be initiated for a branch ATM as well as a remote ATM. At step 312, configuration data may be retrieved. An ATM device may phone home to a central system to retrieve configuration information and initiate the build. At step 314, phone home information may be validated. At step 316, any issues may be resolved. At step 318, ATM progress may be monitored. For example, a REM Tool of an embodiment of the present invention changes the desired state of an ATM device based on software version changes and monitors ATM progress (with regards to software and patch management, etc.) via an interactive user interface. At step 320, issues may be identified. At step 322, a recover ATM action may be initiated. For example, a build step may be re-initiated. At step 324, the next batch of ATMs may be identified and processed. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

Figure 4:
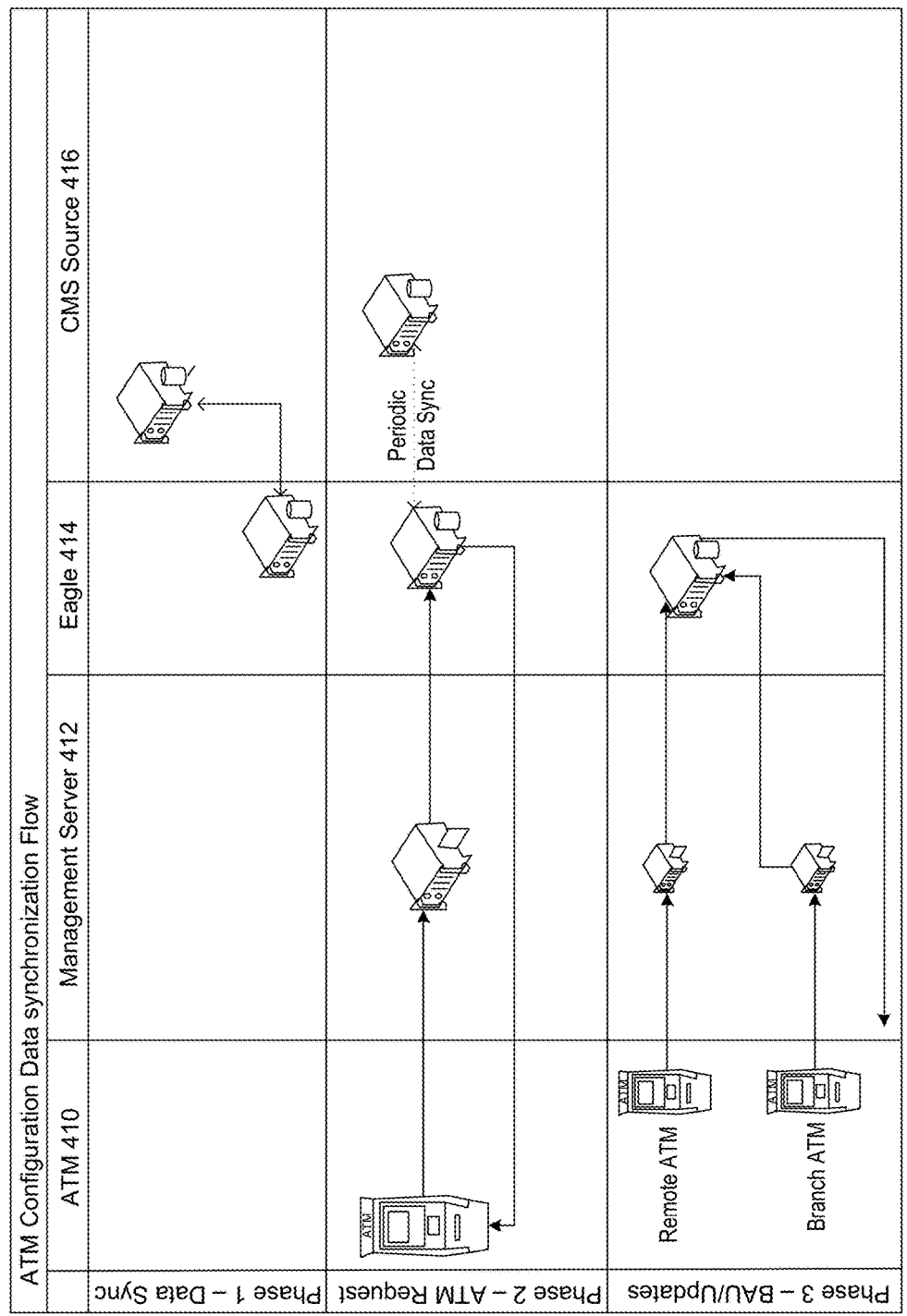
FIG. 4 is an exemplary flow diagram of ATM Configuration Data Synchronization, according to an embodiment of the present invention.

FIG. 4 is an exemplary flow diagram of ATM Configuration Data Synchronization, according to an embodiment of the present invention. FIG. 4 illustrates an exemplary flow between ATM 410, Management Server 412, Eagle 414 (which represents ticketing and configuration servers) and Channel Management System (CMS) Source 416. An embodiment of the present invention is directed to a syncing process. FIG. 4 illustrates an exemplary three phases, where Phase 1 represents Data Sync; Phase 2 represents ATM Request; and Phase 3 represents BAU/updates.

Phase 1 represents a data synchronization feature. CMS may perform a periodic push of data to Eagle 414. As records are updated, they may be pushed to Eagle. These records may house a copy for usage in the Phone Home process and the Software Scheduling Tool. CMS source 416 may perform CMS Data Entry, Data Recovery and Eagle Data Push Back. For CMS Data Entry, operators may enter data into system for BAU and updates may be recorded as changes occur. For Data Recovery, in the event of an Eagle/CMS Database failure or unavailability, a process to retransmit the changes may need to be in place to ensure that pending changes are not lost. For Eagle Data Push Back, Eagle database may have the ability to feed back into CMS for certain entries when automatic updating is required. Pull from ATM feeding updated information to CMS in certain cases.

Phase 2 illustrates an ATM Request. ATM 410 may request data from Phone Home via a query, such as a web query. The Server 412 may broker the request. ATM 410 may send up unique information to classify itself (e.g., MAC, UUID, Serial, IP Address, etc.). Infrastructure Team Database may hold repository of ATM Configurations and build information. CMS 416 may perform a periodic data synchronization. At 414, Infrastructure Team Database server may house the Phone Home database and the webserver for accessing the data via IIS requests. Configuration data may be returned to ATM 410 for build/software versioning via Server 412.

Phase 3 represents BAU/Updates. The ATM (branch remote) may call to Phone Home server to determine its build information. The ATM (branch/remote) may also Phone Home for BAU purposes to determine if its state needs to change, e.g., software scheduling version changes/preload; operating software migration, etc. Server 414 may send configuration data to terminals at 410 for build/software versioning.

An embodiment of the present invention treats ATMs as unique devices that include hardware, operating system (OS) and application sets. An embodiment of the present invention is directed to configuring ATM devices with configuration elements to properly build the OS and applications that reside on it. According to an embodiment of the present invention, when an ATM is reimaged or needs to change its BAU software stack/entitlements, a phone home call may be initiated from the ATM to obtain an appropriate set of configuration changes.

For example, an ATM device may boot into a service OS environment, in which it may issue a Phone-Home call to a centralized webserver. In this phone-home example, the ATM device may send its unique hardware information to differentiate itself from other ATMs. Unique hardware information may include MAC address of the ATM, for example.

A webserver may serve functions, including receive and/or send ATM configuration data for ATM devices and further manage the database for data synchronization from CMS for specific application data. The webserver/database may look up the configuration data for the individual ATM that is requesting it and return known values assigned in the database row, for example.

According to an embodiment of the present invention, a CMS server may represent an input server that houses ATM specific application data that is known and needed for configuration of the ATM application stacks. Data fields to perform an unattended and automated build of an ATM may be pushed from CMS to Eagle for the ATM's consumption and usage. Once the ATM receives the response from the webserver, these values may be saved locally on the ATM file system and used in various places to perform an automated and touchless image processing.

ATM attributes may include various combinations of device related data. Such information may include MAC Address; IP Address, Gateway, Subnet Mask, Location Type, Communication Type, ATM Domain, Time Zone, Hostname, Screen Orientation, Term ID, Software Stack, Manufacturer, Model, Family, Environment, State, Values (for app configuration), etc.

A MAC Address may represent a unique identifier that identifies an ATM. This value is available on the network adapter of the device. Other forms of identification may be applied. Location Type may represent a physical classification of where an ATM is located. Communication Type may represent a physical classification of how the ATM connects to the network. Term ID may represent an ATM value provided by CMS, used in hostname and ATM applications. Values (for app configuration) may include Terminal Type, Deposit Friendly, Deposit Media Processing Mode, Operator Panel Present, Configured Cassettes; Cassette Configuration, Card Reader Type, Card Reader Orientation, Coin Dispenser Present, Coin Dispenser Denomination Configuration, Cash Recycler Mode, Master Volume, Wave Volume, Work Area, ABuild (build value of ATM device), etc.

After an ATM boots into its OS, the ATM may obtain its IP address. For example, a line of business (LOB) may determine that static IPs is the mandatory way to set them onto the ATM. To obtain the IP, the system may perform pre-imaging, where the ATM IP information may be saved to the data partition and synced to an external memory, e.g., a USB, if present. To set the IP, the saved configuration may then be used to set the static IP once booted into a final OS.

FIG. 5 is an exemplary screenshot of a Phone Home interface, according to an embodiment of the present invention. As shown in FIG. 5, an ATM device may be identified by a MAC address as well as Server ID, with a list of attributes and corresponding values.

An embodiment of the present invention may involve a process that includes conversion, rebuild and a New-Build. A Build may refer to when an ATM device goes through an operating system (OS) build process. A Conversion may represent a change from a non-managed OS via DVD today over to a managed OS of an embodiment of the present invention. ATM Rebuild may refer to where an ATM is identified that its OS/Software state needs to be rebuilt. The OS and software stack may then be re-imaged via remote/local methods (pxe/lsb/usb). A New Build may represent when a factory ATM is initialized and needs to have its OS built.

According to an embodiment of the present invention, an ATM device may leverage Phone Home data during a build to self-identify to the database and retrieve associated build configuration during OS imaging phases. The data may be utilized throughout the build for various configuration items.

Also, CMS data may be pre-staged for the asset in question with all the required values. During the build process, a Phone Home process may be initiated. The Phone Home process may display configuration information. If an issue is found, the incorrect field in CMS may be modified and the changes may be automatically saved. CMS may replicate change in "real time" to Eagle.

An embodiment of the present invention may involve a Hardware swap. For a System board replacement and/or NIC replacement, an embodiment of the present invention may change a primary value (e.g., MAC) that is keyed off from an ATM build perspective from a central database. For example, an ATM device may experience a hard drive swap, video monitor swap, and/or other update in hardware. In this example, a Phone Home process may push the change to CMS because the infrastructure team software will know that there was a configuration change made on the ATM. If the hardware swap being performed does not change vital information, then no update to CMS is necessary. However, a hard drive swap would lose any saved IP information. In this example, the ATM device may leverage Phone Home data during the build to self-identify to the database and retrieve its build configuration during the OS imaging phases. This data may be utilized throughout the build for various configuration items.

According to an embodiment of the present invention, ATM devices may execute scripts to facilitate a Phone Home client side scripting. For example, scripts may determine if a previous Phone Home file exists, and then load it into memory. The script may then make a query (e.g., web query) to a Server via a server redirect. If a good return is found, then the system may parse and write the values to the Phone Home file.

Figure 6:
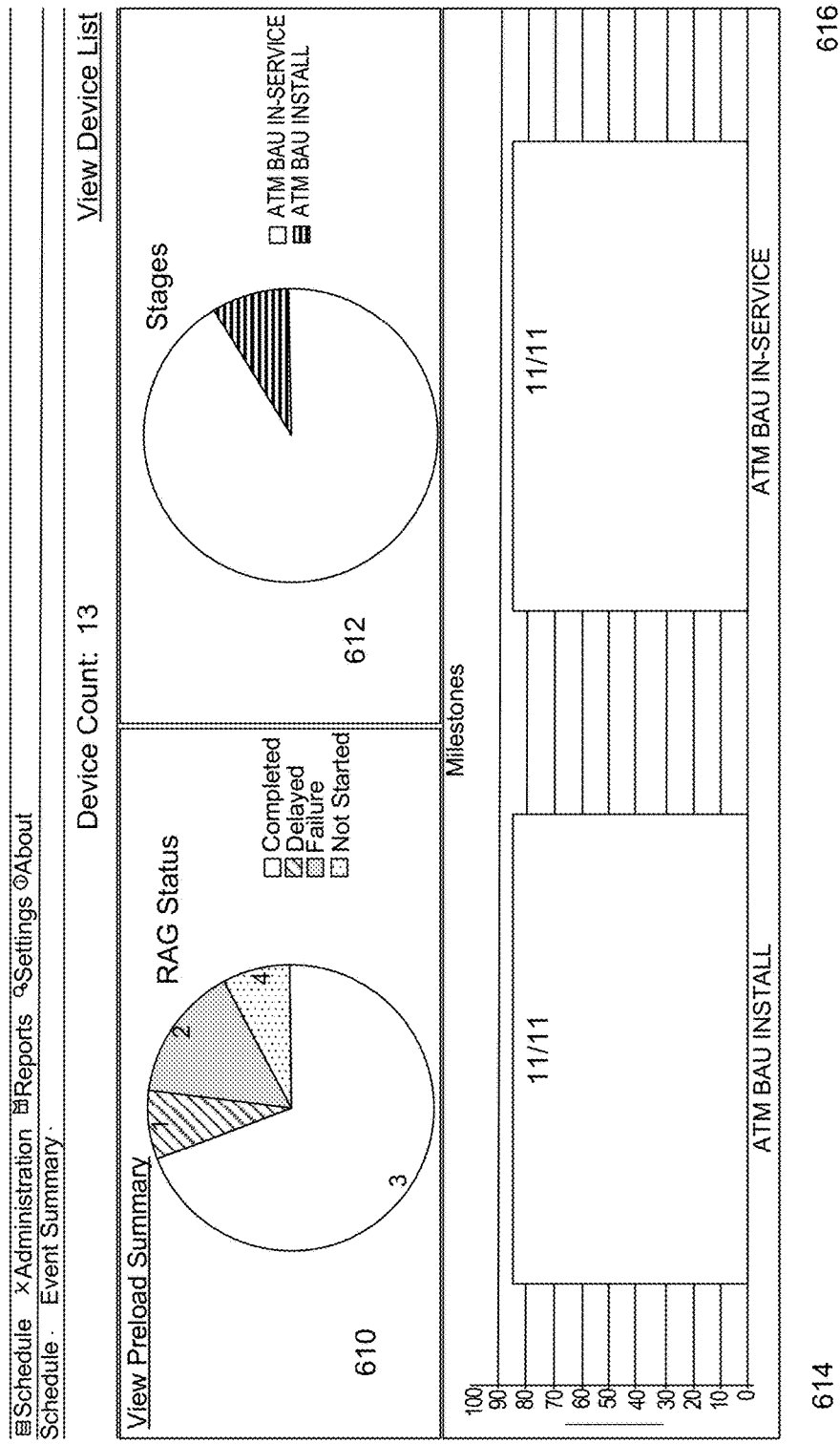
FIG. 6 is an exemplary screenshot of a REM Tool, according to an embodiment of the present invention.

FIG. 6 is an exemplary screenshot of a REM Tool, according to an embodiment of the present invention. The Retail Event Management Tool may include a user interface that integrates multiple backend systems. The REM Tool may manage and control operating software migrations, software updates and other actions. As shown in FIG. 6, the REM Tool may identify preload summary for a set of devices, e.g., device count 13. Red/Amber/Green (RAG) Status for each device may be displayed in various formats, at Section 610. For example, Green may indicate all systems and processes within or exceeding normal tolerance for timing; Amber may represent one or more timings are nearing or slightly over expected SLA and Red may indicate normal SLA timing has been breached and needs attention. Other graphics and indicators may be applied. The status may include competed, delayed, failure, not started. Additional details concerning the status for each device may be provided. Section 610 illustrates an exemplary pie graphic. Other illustrations, formats and graphics may be implemented. FIG. 6 may also include Stages, at Section 612. Section 612 illustrates ATM in service and ATM with installs.

An event may have any number of milestones to complete the progress. For normal ATM software uplifts/changes, there may be two main milestones, such as ATM BAU install and ATM BAU in-service. An ATM may start a process and then self check-in to the REM Tool for status updates to users. For example, it may post status, such as ATM BAU INSTALL with a success or failure message (as shown in 610), which means that it has started that phase. In addition, the ATM may send a status (e.g., good/bad) that represents it at least made it to that milestone. Section 612 illustrates that 2 devices (11/13) have not checked in yet to the first milestone (as indicated by the small slice of the pie chart).

Sections 614 and 616 illustrate ATM installs and ATM in service. As shown in FIG. 6, Sections 614 and 616 represent, in bar graph form, a count of devices and achieved/completed milestones. Other graphics, formats and illustrations may be implemented. In this example, the bar graph percentage goes from 0-100, 100 representing that all device have checked-into or completed the given milestone. In this example, there are 13 devices as part of this particular event. There are two milestones as part of this event, represented by each bar graph (namely, ATM BAU Install and ATM BAU IN-SERVICE). As shown in Section 614, ATM BAU INSTALL milestone has 11 devices that have tried or successfully completed the milestone representing about ~85% of the total 13 devices. As shown in this example, the remaining two apparently did not even try to start, otherwise the fraction would have stated 11/13 instead of 11/11 inside the bar graph. The same analysis applies to the ATM BAU IN-SERVICE, at Section 616.

FIG. 7 is an exemplary screenshot of a REM Tool, according to an embodiment of the present invention. FIG. 7 provides details concerning a subset of devices. In this example, a user may view milestone, last action, start date, end date, duration, estimated time and status. Other data and specifics may be provided.

Figure 8:
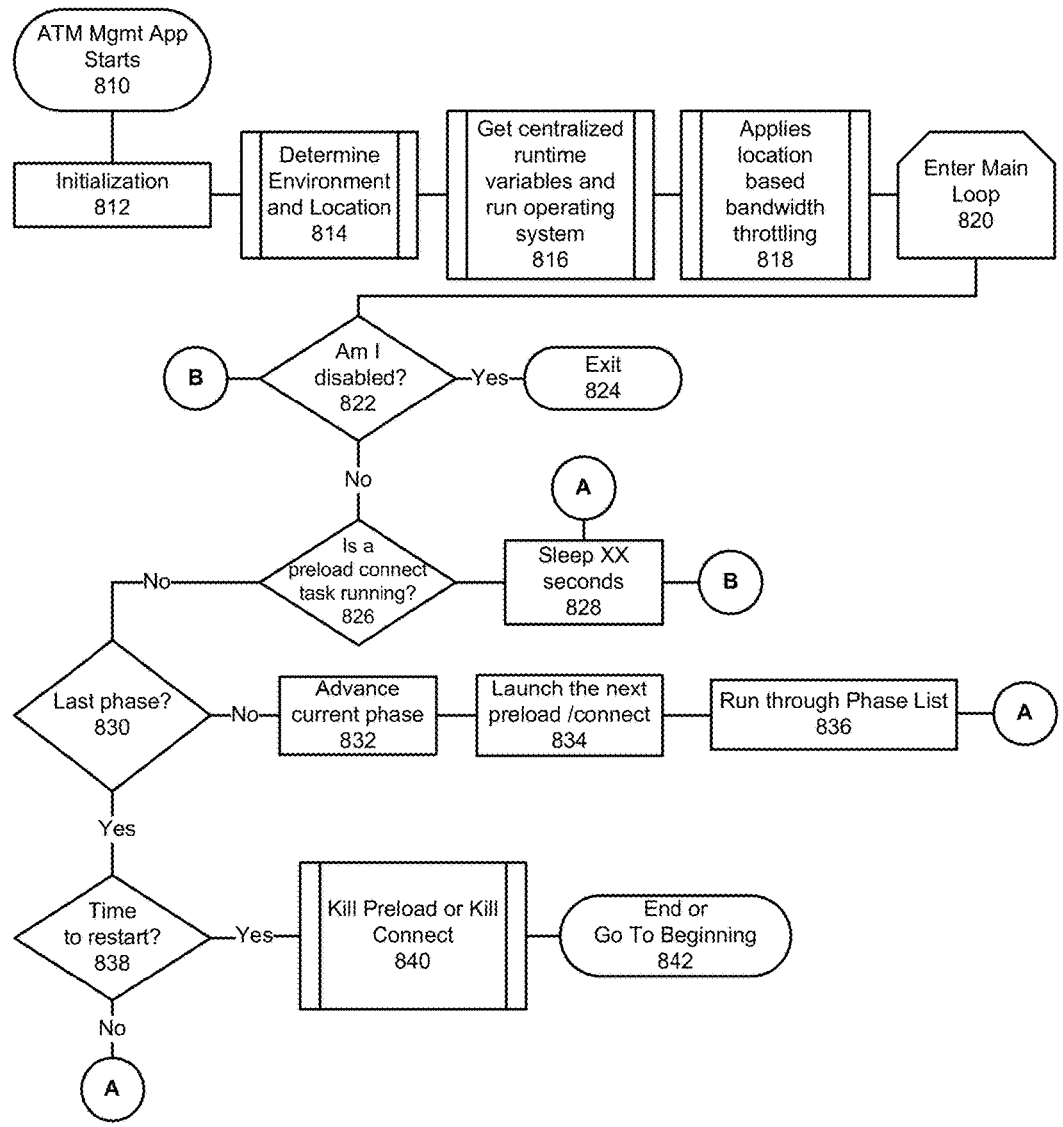
FIG. 8 is an exemplary flowchart for ATM Management Tool, according to an embodiment of the present invention.

FIG. 8 is an exemplary flowchart for ATM Management Tool, according to an embodiment of the present invention. At step 810, an ATM Management application may be initiated. At step 812, an initialization process may be invoked. At step 814, the ATM Management application may determine an environment and location. This may apply to one or more ATM devices. At step 816, the ATM Management application may identify centralized runtime variables and execute an operating software. At step 818, the ATM Management application applies location based bandwidth throttling. At step 820, a main loop may be entered. At step 822, an ATM disabled determination may be made. If yes, the ATM Management application is exited at 824. If no, the ATM Management application determines whether a preload connect task is running, at step 826. If yes, a sleep mode may be applied for a predetermined period of time (e.g., 60 seconds). If no, the ATM Management application determines whether the last phase is complete. If no, a current phase is advanced, at step 832. At step 834, a next preload or connect is launched. At step 836, a phase list may be executed, which may include preload critical, install critical, preload agent maintenance, preload active/build, preload patch, preload next, preload operating software and preload latest. If the last phase is not done, a determination whether to restart may be made at step 838. If yes, the preload or connect is terminated, at step 840. The process ends or returns to the beginning, at step 842. The order illustrated in FIG. 8 is merely exemplary. While the process of FIG. 8 illustrates certain steps performed in a particular order, it should be understood that the embodiments of the present invention may be practiced by adding one or more steps to the processes, omitting steps within the processes and/or altering the order in which one or more steps are performed.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

While the exemplary embodiments described herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by a Processor may be stored and cataloged in a Database which may comprise or interface with a searchable database. The database may comprise, include or interface to a relational database. Other databases, such as a query format database, a Standard Query Language (SQL) format database, a storage area network (SAN), or another similar data storage device, query format, platform or resource may be used. The database may comprise a single database or a collection of databases, dedicated or otherwise. In one embodiment, the database may store or cooperate with other databases to store the various data and information described herein. In some embodiments, the database may comprise a file management system, program or application for storing and maintaining data and information used or generated by the various features and functions of the systems and methods described herein. In some embodiments, the database may store, maintain and permit access to participant information, transaction information, account information, and general information used to process transactions as described herein. In some embodiments, the database is connected directly to the Processor, which, in some embodiments, it is accessible through a network, such as a communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34b is analog modem connection, a cable modem, an Asynchronous Transfer Mode (ATM) connection, a Fiber Distributed Data Interface (FDDI) connection, or a Copper Distributed Data Interface (CDDI) connection.

Communications network may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, the processor may include any terminal (e.g., a typical personal computer system, telephone, personal digital assistant (PDA) or other like device) whereby a user may interact with a network, such as communications network, for example, that is responsible for transmitting and delivering data and information used by the various systems and methods described herein. The processor may include, for instance, a personal or laptop computer, a telephone, or PDA. The processor may include a microprocessor, a microcontroller or other general or special purpose device operating under programmed control. The processor may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. The processor may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The processor may also include a network-enabled appliance, a browser-equipped or other network-enabled cellular telephone, or another TCP/IP client or other device.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The embodiments of the present inventions are not to be limited in scope by the specific embodiments described herein. For example, although many of the embodiments disclosed herein have been described with reference to identifying events and communicating notification, the principles herein are equally applicable to other applications. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. A computer implemented system that automates ATM deployment, the system comprises:
    a centralized server comprising a processor;
    a standardized repository that stores ATM configuration data; and
    a datacenter that communicates via a communication network to a first plurality of remote devices, via a remote server, and to a second plurality of remote devices; the centralized server comprises an ATM management tool configured to perform the steps of:
    identifying software installation data for one or more remote ATM devices;
    identifying a network location for the one or more remote ATM devices;
    if the network location identifies one of the remote ATM devices as an external ATM, transmitting the software installation data as a preload to one or more external memory devices—connected to the one of the remote ATM devices, prior to a software build; wherein the transmitting of the software installation data to the one or more external memory devices as a preload does not interrupt the operation of the one remote ATM device;
    if the network location identifies the one or another one of the remote ATM devices as an internal ATM, transmitting the software installation data as a preload to a local server of the one or the another one of the remote ATM devices, prior to a software build; wherein the transmitting of the software installation data to the local server as a preload does not interrupt the operation of the one or the another one of the remote ATM devices; and
    remotely installing the software installation data on the one or more remote ATM devices after the software installation data has been transmitted as a preload to the one or more external memory devices or to the local server.

2. The system of claim 1, wherein the ATM management tool is integrated with a Phone Home Tool that receives a remote request from the one or more remote ATM devices and transmits, in response to the remote request, configuration data to the one or more remote ATM devices to facilitate an automated software build.

3. The system of claim 1, wherein the software installation data is preloaded to a cache local to the one or more remote ATM devices.

4. The system of claim 3, wherein the cache is part of a local server.

5. The system of claim 1, wherein during a software build, the one or more remote ATM devices accesses the preloaded software installation data.

6. The system of claim 1, wherein the centralized server comprises a Software Policy Tool that standardizes disparate ATM models.

7. The system of claim 1, wherein during the transmitting the software installation data as a preload to the one or more external memory devices, sensitive customer data that is transmitted is encrypted.

8. A non-transitory computer readable medium containing program instructions that automates ATM deployment, wherein execution of the program instructions by one or more processors of a computer system causes the one or more processors to carry out the steps of:
- identifying software installation data for one or more remote ATM devices;
- identifying a network location for the one or more remote ATM devices;
- if the network location identifies one of the remote ATM devices as an external ATM, transmitting the software installation data as a preload to one or more external memory devices connected to the one of the remote ATM devices, prior to a software build; wherein the transmitting of the software installation data to the one or more external memory devices as a preload does not interrupt the operation of the one of the remote ATM devices;
- if the network location identifies the one or another one of the remote ATM devices as an internal ATM, transmitting the software installation data as a preload to a local server of the one or the another one of the remote ATM devices, prior to a software build; wherein the transmitting of the software install data to the local server as a preload does not interrupt the operation of the one or the another one of the remote ATM devices; and
- remotely installing the software installation data on the one or more remote ATM devices after the software installation data has been transmitted as a preload to the one or more external memory devices or to the local server.

9. The non-transitory computer readable medium of claim 8, wherein the ATM management tool is integrated with a Phone Home Tool that receives a remote request from the one or more remote ATM devices and transmits, in response to the remote request, configuration data to the one or more remote ATM devices to facilitate an automated software build.

10. The non-transitory computer readable medium of claim 8, wherein the software installation data is preloaded to a cache local to the one or more remote ATM devices.

11. The non-transitory computer readable medium of claim 10, wherein the cache is part of a local server.

12. The non-transitory computer readable medium of claim 8, wherein during a software build, the one or more remote ATM devices accesses the preloaded software installation data.

13. The non-transitory computer readable medium of claim 8, wherein the centralized server comprises a Software Policy Tool that standardizes disparate ATM models.

14. A computer implemented method that automates ATM deployment from a centralized server, the computer implemented method comprising the steps of:
- identifying software installation data for one or more remote ATM devices;
- identifying a network location for the one or more remote ATM devices;
- if the network location identifies one of the remote ATM devices as an external ATM, transmitting the software installation data as a preload to one or more external memory devices connected to the one of the remote ATM devices, prior to a software build; wherein the transmitting of the software installation data to the one or more external memory devices as a preload does not interrupt the operation of the one of the remote ATM devices;
- if the network location identifies the one or another one of the remote ATM devices as an internal ATM, transmitting the software installation data as a preload to a local server of the one or the another one of the remote ATM devices, prior to a software build; wherein the transmitting of the software installation data to the local server as a preload does not interrupt the operation of the one or the another one of the remote ATM devices; and
- remotely installing the software installation data on the one or more remote ATM devices after the software installation data has been transmitted as a preload to the one or more external memory devices or to the local server.

15. The method of claim 14, wherein the ATM management tool is integrated with a Phone Home Tool that receives a remote request from the one or more remote ATM devices and transmits, in response to the remote request, configuration data to the one or more remote ATM devices to facilitate an automated software build.

16. The method of claim 14, wherein the software installation data is preloaded to a cache local to the one or more remote ATM devices.

17. The method of claim 14, wherein during a software build, the one or more remote ATM devices accesses the preloaded software installation data.

18. The method of claim 14, wherein the centralized server comprises a Software Policy Tool that standardizes disparate ATM models.

* * * * *